Feb. 1, 1955     C. FIELD     2,700,811
METAL WOOL APPARATUS

Filed Aug. 13, 1948     9 Sheets-Sheet 1

INVENTOR.
CROSBY FIELD
BY
ATTORNEYS

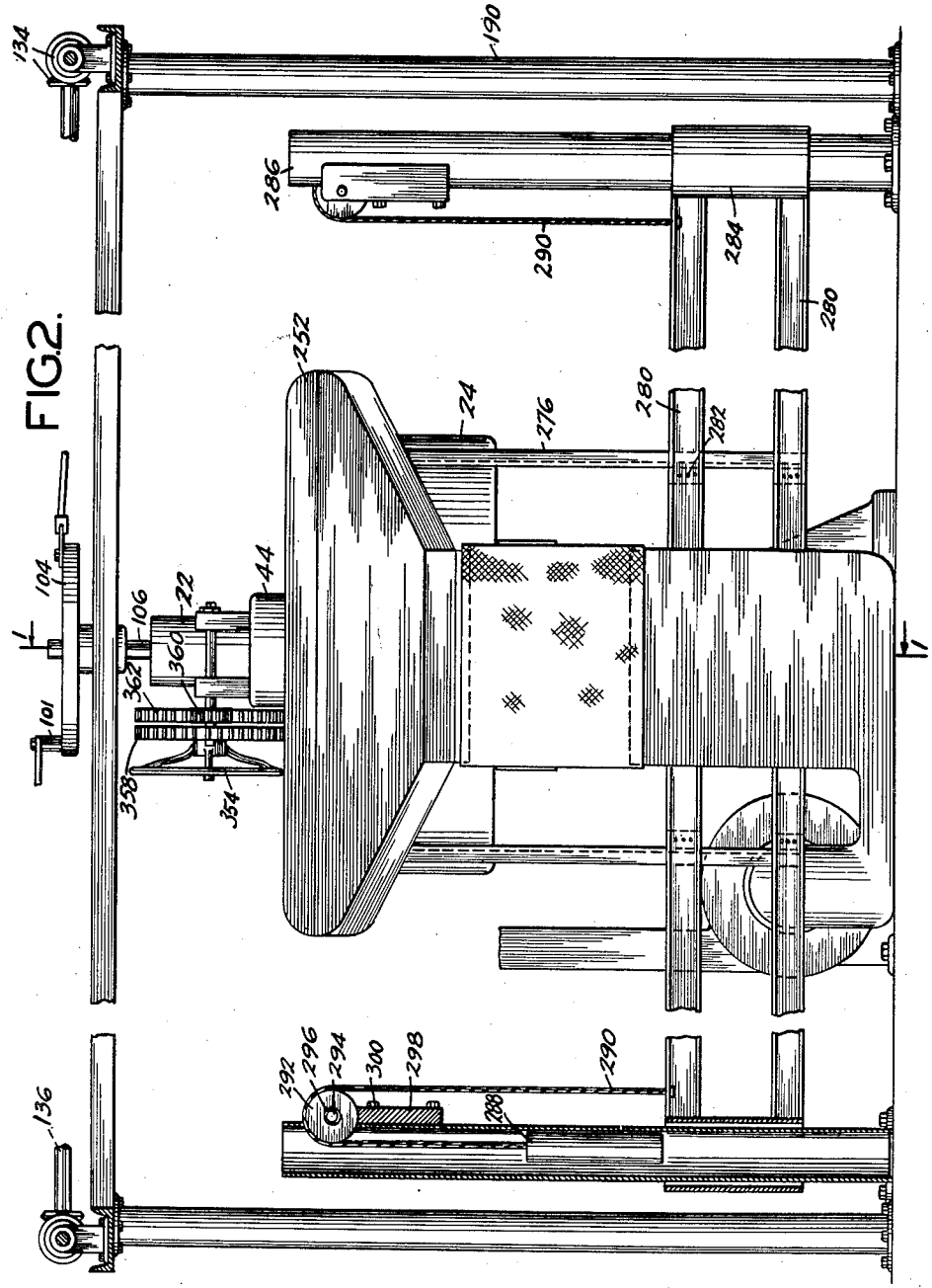

Feb. 1, 1955 C. FIELD 2,700,811
METAL WOOL APPARATUS
Filed Aug. 13, 1948 9 Sheets-Sheet 3

INVENTOR.
CROSBY FIELD
BY
Blair, Curtis & Hayward
ATTORNEYS.

Feb. 1, 1955

C. FIELD 2,700,811

METAL WOOL APPARATUS

Filed Aug. 13, 1948

INVENTOR.
CROSBY FIELD
BY
Blair, Curtis & Hayward
ATTORNEYS.

Feb. 1, 1955. C. FIELD 2,700,811
METAL WOOL APPARATUS
Filed Aug. 13, 1948 9 Sheets-Sheet 5

INVENTOR.
CROSBY FIELD

BY

ATTORNEYS.

Feb. 1, 1955
C. FIELD
2,700,811
METAL WOOL APPARATUS
Filed Aug. 13, 1948
9 Sheets-Sheet 6
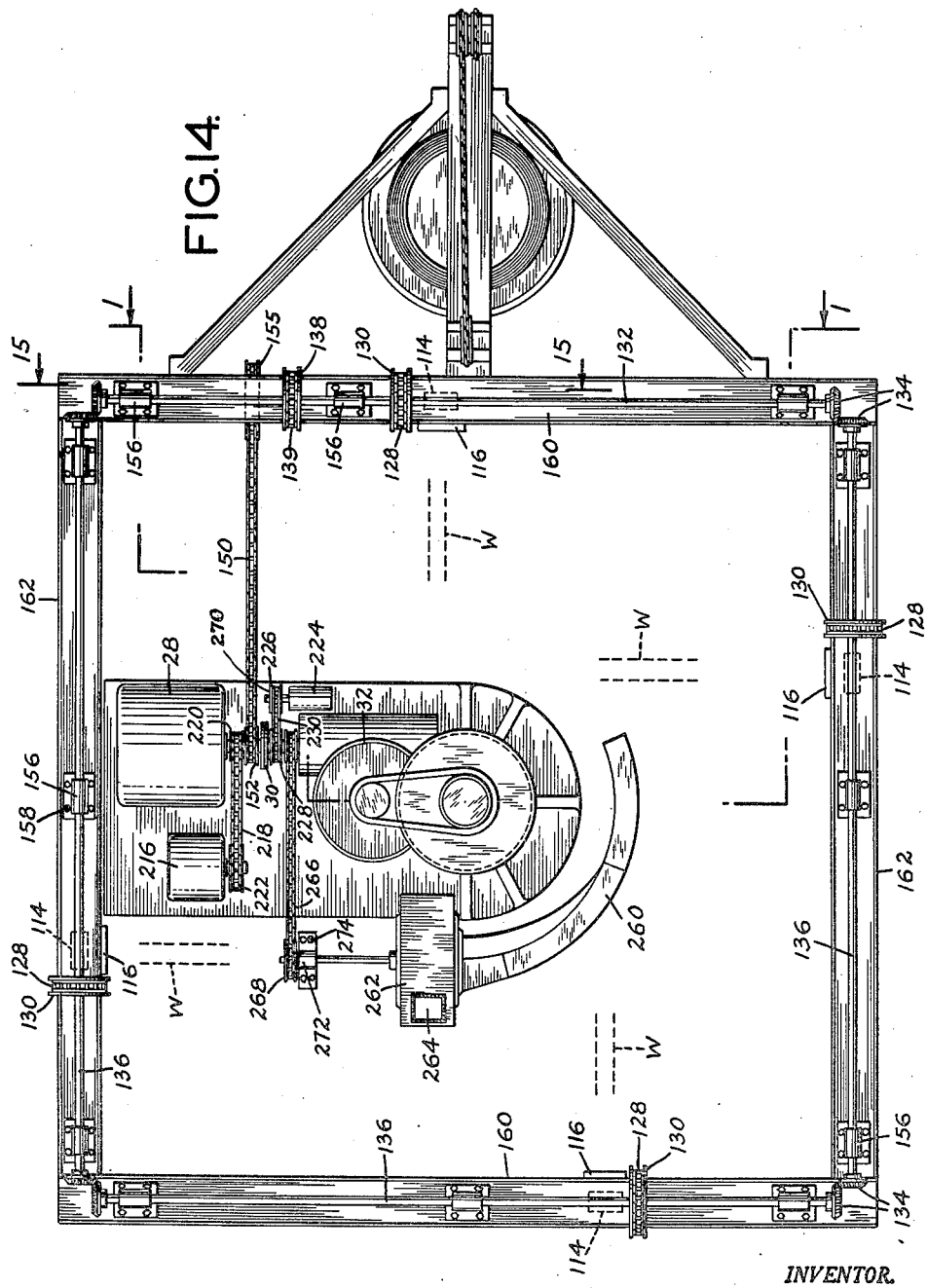
INVENTOR.
CROSBY FIELD
BY
Blair, Curtis & Hayward
ATTORNEYS.

Feb. 1, 1955     C. FIELD     2,700,811
METAL WOOL APPARATUS
Filed Aug. 13, 1948     9 Sheets-Sheet 7

INVENTOR.
CROSBY FIELD
BY
*Blair, Curtis + Hayward*
ATTORNEYS.

Feb. 1, 1955     C. FIELD     2,700,811
METAL WOOL APPARATUS
Filed Aug. 13, 1948     9 Sheets-Sheet 8
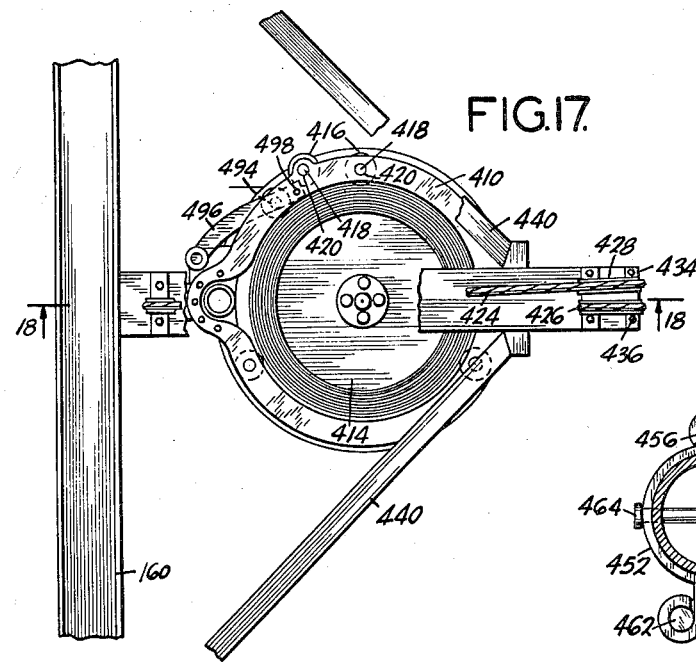
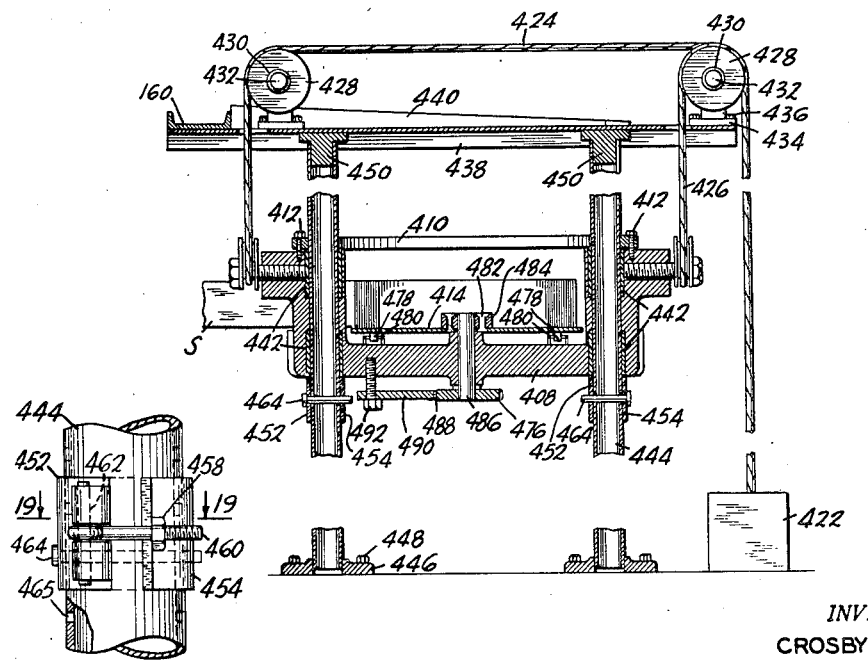
INVENTOR.
CROSBY FIELD
BY
Blair, Curtis & Hayward
ATTORNEYS.

Feb. 1, 1955 C. FIELD 2,700,811
METAL WOOL APPARATUS
Filed Aug. 13, 1948
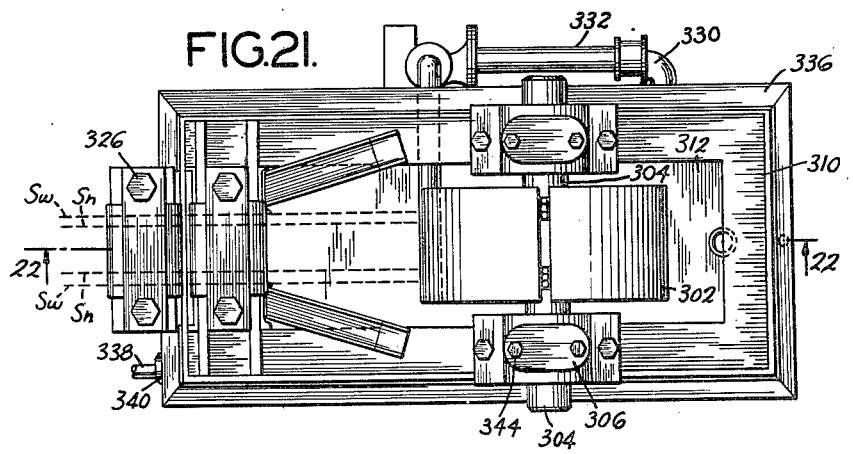
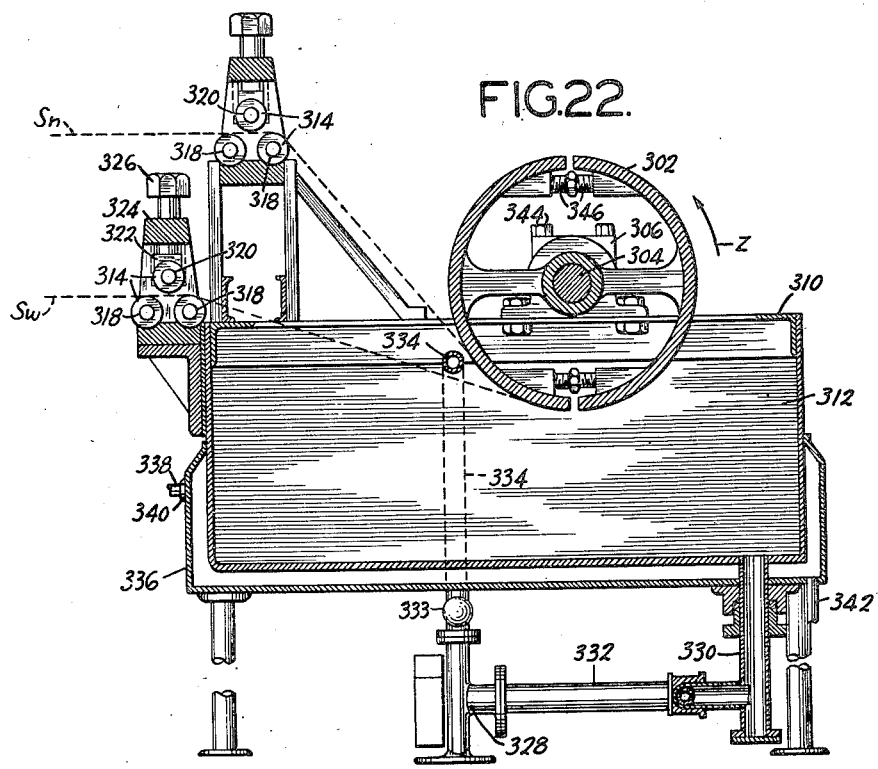
INVENTOR.
CROSBY FIELD
BY
Blair, Curtis + Hayward
ATTORNEYS.

United States Patent Office 2,700,811
Patented Feb. 1, 1955

2,700,811

METAL WOOL APPARATUS

Crosby Field, Brooklyn, N. Y.

Application August 13, 1948, Serial No. 44,008

13 Claims. (Cl. 29—4.5)

This invention relates to apparatus for and methods of making metal wool and similar products. It constitutes an important step forward over apparatuses and methods of the types illustrated by my Patent Nos. 1,608,478 and 1,608,481.

The usual method of making steel and similar metal wools today in the United States for commercial use comprises first the selection of a proper grade of steel; the grade is quite limited in its chemical and physical characteristics. The steel is specially "cropped," rolled into rods, and then drawn in several passes into wire of No. 12 gauge, that is, approximately .106 in. in diameter. In this fashion cold working produces a steel wire that can readily be shaved by serrated knives, producing a chip of the strength and resiliency required. The chips thus obtained are called steel wool.

For numerous reasons, some of them obvious, a wire must be guided throughout its course while being shaved, hence it cannot all be shaved but a small amount of its cross section must be discarded as scrap. Because of this uncut portion the commercial yield of metal wool from wire rarely exceeds 80 per cent, although in some of the machines I have invented a higher yield than 80 per cent has been obtained. By yield is meant the weight of the wool produced divided by the weight of the wire put into the process. One object of my invention is to provide a practicable machine whereby the yield of wool may regularly be made to approach 100 per cent.

Strip stock may be produced by processes that are less wasteful and less costly than those employed in the production of wire stock. Another object of my invention is to provide a method and machine for the cutting of wool from strip stock.

Because of the large number of knives required to shave in a single pass a wire approximately .106 in. in diameter into wool having its widthwise dimensions varying from about .0002 in. to about .007 in., a single pass wire shaving machine must be large and costly. Any change in the wire shaving process which does not reduce the efficiency nor the capacity of the machine, because of technological reasons would require an increase in the cost of the wire stock or of the wool manufacturing process itself. One of the objects of my invention, therefore, is to provide a new type of machine which is small but which is capable of large output at high efficiency from inexpensive stock materials.

A great difficulty in the manufacture of steel wool by existing processes lies in maintaining fine adjustments to the knives so as to obtain a uniform chip. A further objective of my invention resides in the provision of a construction wherein the various knives form parts of a unitary floating assembly which automatically holds adjustments and eliminates the need for continual individual adjustments to the knives.

A still further object of this invention is the increase of production obtained in the use of relatively wide cutting tools by the application of air blasts which not only cool the stock at the point of contact with the knife but also cool the cutting edges of the knives. The blasts blow away any very fine chips or dust and because of these and other factors a relatively high cutting speed may be maintained.

For certain classes of trade it is desirable to produce a mixture of metal wool with a detergent compound such as a soap. The present practice is to manufacture the wool and compound separately and then to mix them. One of the objects of my invention is to provide a stock material consisting of metal strip and soap or other compound and a machine for operating upon this stock material to obtain directly the desired end product.

One of the further objects of my invention is to provide a method of and apparatus for the production of mixtures of metal wools and other plastic, semi-plastic, jelly-like, or solid compounds.

Additional objectives will be in part pointed out as the description proceeds and will in part become apparent therefrom. The invention accordingly consists in the features of construction, combinations of elements, arrangements of parts and methods of operations as will be exemplified in the structures and sequences and series of steps to be hereinafter indicated and the scope of the application of which will be set forth in the claims.

In this specification and the accompanying drawings, I have shown and described a preferred embodiment of my invention and suggested various modifications thereof; but it is to be understood that these are not intended to be exhaustive nor limiting of the invention, but on the contrary are given for purposes of illustration in order that others skilled in the art may fully understand the invention and the principles thereof and the manner of applying it in practical use so that they may modify and adapt it in various forms, each as may be best suited to the conditions of a particular use.

In the drawings:

Figure 2 is a side elevation taken along the line 2—2 of Figure 1;

Figure 14 is a plan view taken along the broken line 14—14 of Figure 1;

Figure 17 is a fragmentary plan view with parts broken away of a strip winding mechanism embodying the invention;

Figure 18 is a view taken along the line 18—18 of Figure 17;

Figure 19 is a fragmentary plan view on an enlarged scale taken along the line 19—19 of Figure 20;

Figure 20 is a fragmentary elevation on an enlarged scale of a clamping construction used in the strip winding mechanism;

Figure 21 is a plan view of another strip winding mechanism embodying the invention; and Figure 22 is a view taken along the line 22—22 of Figure 21.

*Wool cutting*

In the illustrative embodiment (see Figure 1) it will be noted that I provide a base 20 with a central tubular nonrotating shaft 22 keyed or otherwise firmly affixed therein. Upon this shaft is mounted a rotor 24 on thrust and radial roller bearings 26.

Figure 1:
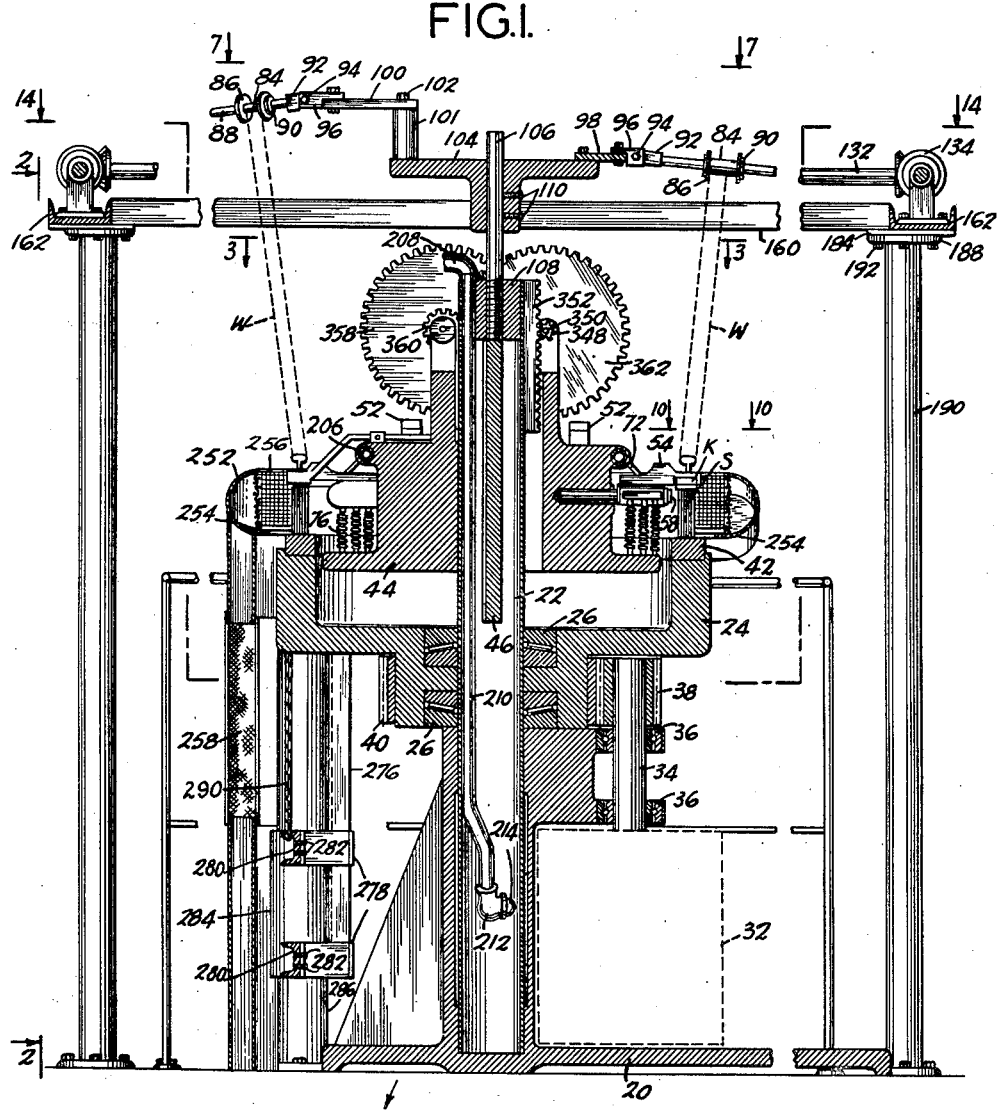
Figure 1 is an elevational view partly in section through a machine embodying my invention (see line 1—1 of Figure 3)

Power for turning rotor 24 is provided (see also Figure 14) by a motor 28 operating through a flexible coupling 30, a gear reducer 32 and a jack shaft 34 (see Figure 1). The jack shaft has its longitudinal axis vertical and is held in base 20 by ball bearings 36. At its upper end it carries a pinion 38 which meshes with a ring gear 40 attached to rotor 24. Rotor 24 is provided with a rim 42 which rim carries securely fastened to it in a manner to be described hereinafter a coil of metal strip S. This strip may or may not have layers of soap or compound coiled within it as in turn also will be described more fully.

Figure 3:
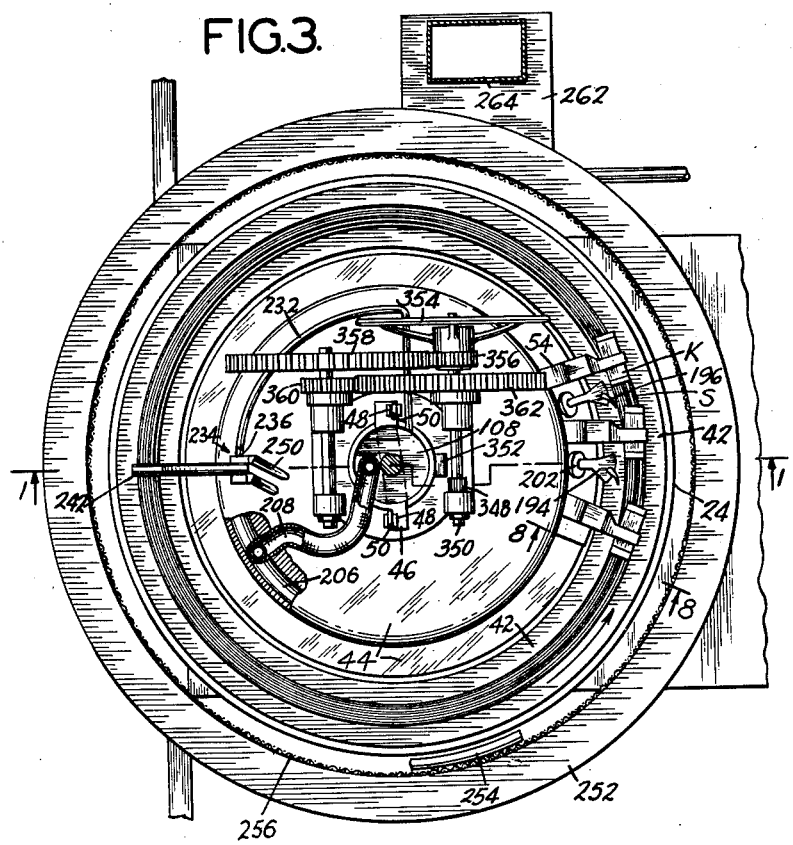
Figure 3 is a plan view of the machine with parts removed taken along the line 3—3 of Figure 1.
Figure 4:
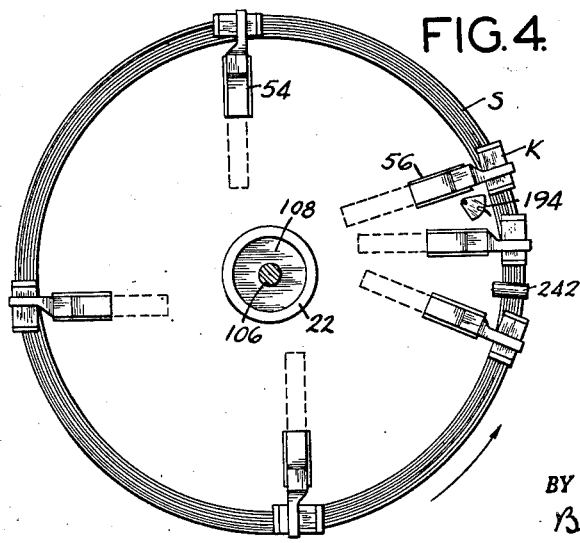
Figure 4 is a fragmentary plan view showing some of the details illustrated in Figure 3.

About vertical shaft 22 is a heavy casting in the form of a spider 44; this spider is free to move vertically but is held against rotation by a torque arm 46 (see also Figure 3).

It will be noted that torque arm 46 carries two roller tracks 48 which cooperate with two similar roller tracks attached to the spider. Between each of these pairs of tracks lies a bearing strip 50 consisting of rollers held in retainers as is well known. Thus, spider 44 may non-rotatably rise and fall on shaft 22 with very little friction.

Figure 8:
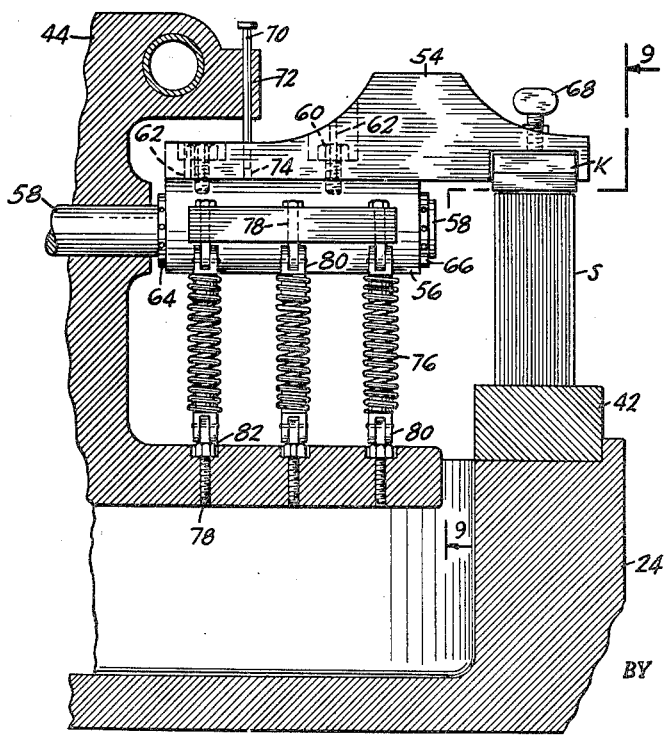
Figure 8 is a fragmentary sectional view taken along the line 8—8 of Figure 3.
Figure 9:
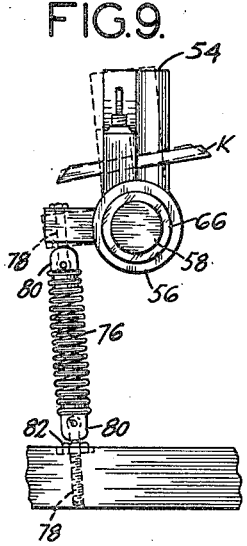
Figure 9 is a view taken along the line 9—9 of Figure 8.
Figure 15:
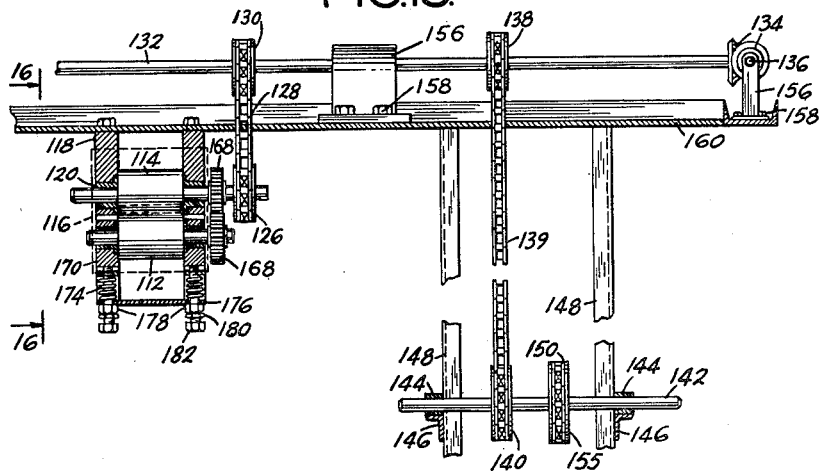
Figure 15 is an elevation, with parts broken away, on an enlarged scale, taken along the line 15—15 of Figure 14.
Figure 16:
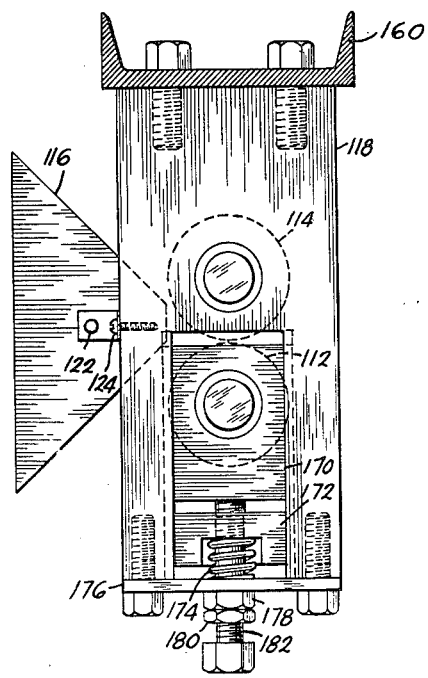
Figure 16 is a view taken along the line 16—16 of Figure 15.

When in cutting position spider 44, and the cutting mechanisms, shafts, and other attachments to the spider yet to be described, cause it to press upon strip S through a multiplicity of cutting tools K. Additional weights 52 (see Figure 1), may be placed upon the spider to increase the force with which the knives press upon the strip. Each knife K is held in a tool holder 54 (see Figures 8 and 9) which tool holder is securely attached to a tool holder base 56, free to turn on a tool holder shaft 58, which shaft in turn is securely held in spider 44.

Tool holder 54 and tool holder base 56 are secured together by cap screws 60 and dowels 62. Tool holder shaft 58 is tapered where it fits into tool holder base 56 and, as both mating surfaces are accurately ground, it will be seen that the tool holder is accurately guided. The pressure between the mating surfaces is controlled by a tool holder rear nut 64 and a tool holder front nut 66. The knife K is securely held in tool holder 54 by means of wing screws 68. When out of cutting position the tool holder is held upright by a pin 70 which slips through a hole 72 in the upper ledge of spider 44 and into a hole 74 in the top of the tool holder, thus preventing turning of the tool holder by the action of springs 76.

Tool holder base 56 carries a plurality of spring holder bolts 78, each of which supports a spring holder 80. Each spring holder supports one end of a spring 76 (see Figures 8 and 9). The other end of the spring is held in another spring holder 80 and a spring holder bolt 78 in the base of spider 44. These springs are adjustable by spring holder bolts 78 and spring holder lock nuts 82 so that the pressure imposed by the edge of any cutting tool upon the surface of strip S may be varied.

A number of cutting tools is provided so that by means of spring 76 the total weight of the spider and accessories is floated upon the surface presented by the edges of coiled strip S. In the present embodiment twenty of the cutting assemblies are used.

Wool take-off

The machined fibres, whether coated with soap or detergent compound or lubricating oil or cutting oil or not, are gathered together into bands or ribbons as indicated at W (see Figures 1 and 14). The equipment provided for maintaining the travel of ribbons W is shown in Figures 1, 7, 14, 15 and 16.

The bands of metal wool from each cutter are led (see Figures 1 and 7) over idler spools 84 having flanges 86 and freely turning on shafts 88 held between collars 90. Each shaft 88 in turn is held in a pivot 92 which is adjustably held by bolts 94 to another pivot 96 supported either by a short link 98 or a long link 100. Thus the shafts may take any angle desired vertically or horizontally. In order to avoid interference among these shafts and their links, various spacers 101 are provided on studs 102 so that the vertical distances may be varied.

Sshafts 88 are carried by the links just mentioned on a hub 104 which in turn is carried on a vertical shaft 106 screwed into a plug 108 attached to the interior of vertical shaft 22. By means of set screws 110 the position of hub 104 on shaft 106 may be fixed.

Although I have indicated the wool from each individual knife as being gathered on an individual spool 84, it will be understood that I may gather on one spool the wool from several knives if I desire a heavier ribbon for a particular end product.

The other end of wool ribbon W is led over spools 84, as stated, and thence (see Figures 15 and 16) between pairs of rollers 112 and 114 passing first through a funnel guide 116 attached to a frame 118. Frame 118 holds bearings 120 for roller 114. Funnel guide 116 is held to frame 118 by lugs riveted to said guide by rivets 122 and screwed to frame 118 by screws 124.

Roller 114 is turned by a sprocket 126 driven by a chain 128 from a sprocket 130 carried on a shaft 132. This shaft in turn (see also Figure 14) drives mitre gears 134 and the three shafts 136. Shaft 132 is driven by a sprocket 138 turned by a chain 139 driven by a sprocket 140 mounted on a jack shaft 142. This shaft is carried in bearings 144 held on brackets 146 on vertical supports 148. A chain 150 driven by sprocket 152 on flexible coupling 30 of motor 28 drives sprocket 155 on shaft 142. Shaft 132 and shafts 136 are carried by pillow blocks 156 attached by bolts 158 to horizontal wool take-off top supports 160 and 162. Vertical supports 148 extend between support 160 and the floor. Horizontal wool take-off top support 160 also carries a roller frame 118 and bushings 120 in which roller 114 turns. Power roller 114 and idler roller 112 carry large tooth pinions 168 by means of which the idler roller is driven.

Tension on the wool ribbon is maintained by means of a bearing block 170 sliding in grooves in frame 118. A spring block 172 also slides in the same groove and is pressed constantly upwards by means of a spring 174 acting between bearing block 172 and a strap 176. This strap is attached to the lower end of frame 118 by cap screws. The upward movement of spring block 172 is limited by nuts 178 and 180 determining the position and travel of an adjusting screw 182. Longitudinal top supports 160 (see also Figure 1) are carried by plates 184 supported on flanges 188 in turn carried by vertical posts 190. Bolts and nuts 192 attach plates 184 to flanges 188.

From rollers 112 and 114 the wool falls into receptacles or is rolled on a spool or otherwise fed into shaping or packing equipment, as is well understood in the art.

Air blast

I have found that if I introduce blasts of air directly against the strip being cut, at the line of contact between the serrated edge of each cutting knife and the strip, I will obtain a better product of metal wool and at a higher speed. This is probably due in part to the direct cooling effect of the air and in part to keeping the surfaces of the strip free from fine dust or other accumulation which would tend to heat up and weld to the knife or to the strip. The effect of the air blast or wool W is also beneficial in that it aids in leading the wool away from the strip from which it has just been cut with a constant yet gentle and easy to control pull.

Figure 5:
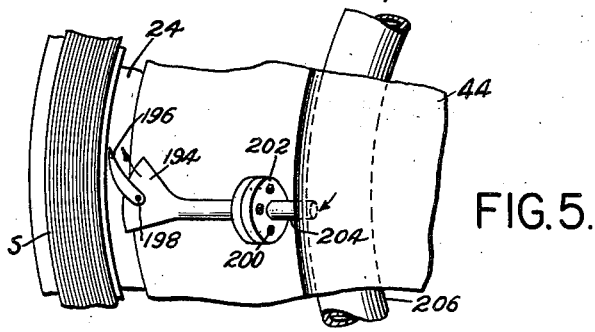
Figure 5 is a fragmentary view on an enlarged scale of an air nozzle and baffle assembly shown in Figure 3.

It will be noted in Figures 3 and 5 that an air jet nozzle 194 ends in a fan shaped portion for blowing the air in a thin and relatively wide jet, and I also provide an air deflector 196 attached to jet nozzle 194 by a rivet 198 (see Figure 5). By means of the deflector I may further control the direction and turbulence of the air.

Jet nozzle 194 includes a flange tapped for machine screws 200 by means of which it is attached to a flange 202 screwed onto an air feed pipe 204, which in turn is connected to an air feed pipe 206. This latter pipe was cast into spider 44 at the time of manufacture and is so bent as to leave an end protruding above the edge of the casting. This end is connected by a flexible conduit 208 with a pipe 210 passing downwardly through plug 108 sealing the top of vertical shaft 22. Pipe 210 extends through shaft 22 and is bent at elbow 212, passing out of the vertical shaft by stub air line 214. The stub air line (see Figure 14) is connected with an air compressor 216 driven by a chain 218 and sprockets 220 and 222 on the shafts of the driving motor 28 and compressor 216 respectively.

Oil system

Figure 6:
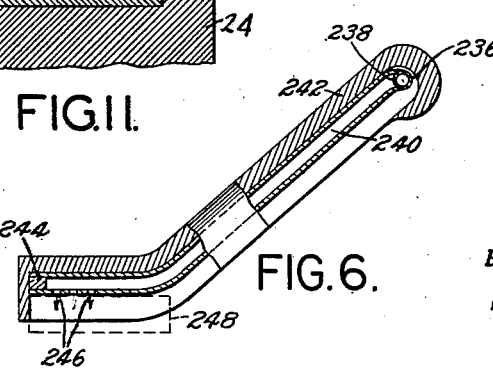
Figure 6 is a fragmentary view on an enlarged scale of an oiling assembly shown in Figure 3.
Figure 7:
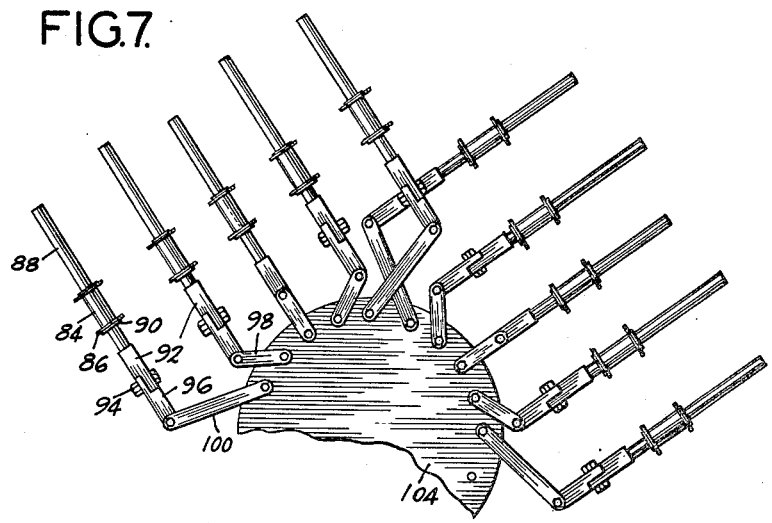
Figure 7 is a fragmentary view taken along the line 7—7 of Figure 1.

When I am cutting metal wool in the absence of any detergent compound I may use a cutting compound. In such cases, in the present embodiment, I put the compound into an oil pump 224 (see Figure 14) driven by sprockets 226 and 228, on the shafts of the oil pump and the gear reducer respectively, and drive chain 230. Upon each revolution of the shaft of the oil pump a few drops of oil are forced into four separate pipes, each of which follows a course similar to that of the air piping; that is (see Figures 1, 3 and 6), up the interior of vertical shaft 22, through top plug 108 and thence through flexible connections to oil feed pipes 232. Sometimes, as when different liquids are to be applied simultaneously to the strip, it is advantageous to provide a separate pump for each oil feed pipe 232; all such pumps may readily be driven from a common shaft. In the present embodiment four oilers are used but more or less than four may be used. It is to be observed that I may use any, or all "oilers" for distribution of metal preservatives or detergents or fluids other than oil which I desire to be present either during cutting or mixed through the wool product.

Oil feed pipe 232 ends in a coupling 234 which is screwed onto a shaft 236 at its hollow end and permits a right angle turn without leaking oil in accordance with coupling constructions well understood in the art. Part way along shaft 236 a hole 238 is drilled into the hollow interior portion of shaft 236 and connected to this hole is a copper tube 240; the copper tube is then led into a hollow casting 242 and the end of the tube is sealed by a plug 244. For a short distance toward the outer end of tube 240, I drill a row of small perforations 246 so that the oil received from the oil feed pipe through coupling 234, hollow shaft 236, and copper tube 240 may leave the pipe and impregnate a felt 248. Shaft 236 is free to turn in a pair of oiler brackets 250 mounted on the top of spider 44.

In the illustrative form each felt 248 is held on strip S during cutting by the weight of protective casting 242. When, however, it is desired to free the surface of the strip for any purpose castings 242 may be swung upwardly and back about their pivots. They may, of course, remain in raised position when it is desired to cut without the addition of any cutting compound.

*Exhaust system*

In the production of metal wool at high speed, the temperature of the metal as it is being cut rises to a point that causes the cutting compound to smoke. In order to take care of this situation and also to vent the dust, fine fragments of wool, and so forth, that are produced by the cutting, I provide (see Figures 1 and 2) a hood 252 consisting of light sheet metal having a semicircular cross-sectional shape supported on an angle frame 254. The curved surface portion of the cross section faces outwards from the machine. The cylindrical opening thus provided facing the machine I cover with a metal screen 256 so that the air in passing through this screen is freed of any larger solid particles and any wool which may accidentally be carried away by the air blast. The air and smoke pass from the bottom of hood 252 through a flexible canvas sleeve 258 connecting to a rigid conduit 260 attached (see also Figure 14) to the suction side of an exhaust fan 262 venting to the roof through a duct 264.

Exhaust fan 262 is driven by a chain 266, passing over sprockets 268 and 270, the latter being on the reduction gear shaft and the former on the exhaust fan shaft. The exhaust shaft is supported in an outboard bearing 272 held by foundation bolts 274.

It becomes desirable to take this hood out of the way when loading the machine with strip to be cut or, for example, when adjustments or inspections are to be made. I support duct 252 and all parts connected with it down to the flexible sleeve (see Figures 1 and 2) on a structural steel frame comprising essentially steel plates 276 attached to angle frame 254 at one end and at the other connected to channel spacers 278. Each spacer is attached to longitudinally placed channels 280 by rivets 282. At their ends channels 280 are welded to pipe guides 284 which surround and are free to slide upon vertical supports 286. The weight of the hood and the longitudinal channels is balanced by counterweights 288 sliding interiorly of vertical supports 286 and connected to the channels by cables 290 which in turn pass over sheaves 292, the shafts 294 for which are carried in bearings 296 by bearing blocks 298 attached to upright posts 286 by screws 300.

The other end of the canvas duct is connected, as has been stated, to metal duct 260 and during operations is maintained taut against the difference in suction pressure within and the atmosphere without by the location of hood 252. If desired, the canvas may be reinforced by metal wire in a rectangular coil section to assist in preventing the sides of the duct from being drawn inwardly during operation. Preferably the exhaust fan is stopped whenever the hood is to be lowered.

*Feed*

There are two different types of material on which the present embodiment is designed to operate. These are coils of metal strip having soap or other compound included in them and plain metal strip without any soap or compound.

When it is desired to supply the machine with metal strip containing a detergent compound, I use the equipment shown in Figures 21 and 22. It comprises essentially a collapsible power driven drum 302 which, by its spokes, is carried upon a shaft 304 free to turn in bearings 306. Bearings 306 are attached to a channel frame 310 of a soap tank 312. To this drum is attached a wide strip of metal Sw and two narrow strips Sn. As drum 302 turns, these strips are tensioned and guided by two sets of rollers 314 so that the narrow strips wind up at or near the edges of the wide strip. Two of the rollers 314 are carried in rigid bearings 318 and a third is disposed approximately half way between the first two and above them in bearings 320 carried by an adjustable block 322 in a frame 324 said block being adjusted by screws 326 so that the tension on the metal strip may be adjustably controlled. Wide strip Sw and narrow strips Sn, each one in special coils from the rolling mill, are fed from a reel or swift, as is well known in the art.

As drum 302 rotates, the soap or other solution in tank 312 is pumped by a power driven pump 328 from the bottom of the kettle through an outlet nipple 330, pipe 332 and a valve 333 into a nozzle pipe 334 which, because of orifices in it near its bottom, keeps the channel space between the two narrow strips and the wide strip filled with soap. The channel and soap filling are promptly wrapped about the strip already on drum 302 as the drum rotates in the direction of arrow Z.

Sufficient soap solution is pumped through nozzle pipe 332 so as to overflow and the overflow is collected in kettle 312 and recirculated. Fresh soap solution from time to time is added to kettle 312. In order to maintain the soap solution at the right temperature, I surround the kettle with an outside jacket 336. Steam or hot water may be fed into the jacket from a source not shown through a pipe 338 and a nozzle 340 and may be returned to a heater through a condensate nozzle 342. In order to conserve heat I may surround my entire kettle or any part thereof with heat insulation.

The coil of compound and strip is then ready to be moved from tank 312. The coil is bound onto drum 302 by binding wires (not shown) as is well known in the art. Cap screws 344 are removed, permitting the removal of the caps of split bearings 306. Shaft 304 is then hoisted by a crane (not shown) and removed to a convenient place where the shaft is "up-ended" into a vertical position. Then drum 302 is sprung inwardly by turning right and left threaded stud 346 and the coil of strip slides off the drum. Stud 346 is then turned in the opposite direction so as to bring drum 302 back to its original shape and the drum is returned to its place over tank 312.

When a coil of strip has been shaved until only a small fraction of an inch remains for clamping to rotor rim 42, the machine is stopped, the hood is lowered, and the tool holders are swung about their shafts 58 against the action of springs 76 and are locked in that position by holding pins 70. Oilers 242 are swung to vertical position and hub 104 and shafts 88 attached to it are removed.

Figure 10:
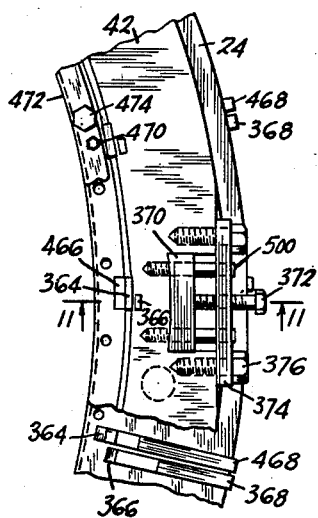
Figure 10 is a fragmentary view taken along the line 10—10 of Figure 1.
Figure 11:
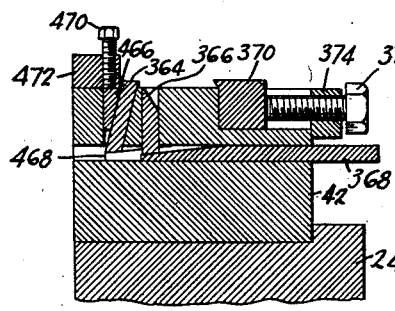
Figure 11 is a sectional view taken along the line 11—11 of Figure 10.

A pinion 348 (see Figure 3) is then slid along a splined shaft 350 until it meshes with a rack 352 (see also Figure 1). By means of a hand wheel 354 turning a pinion 356 meshing with a gear 358, a pair of gears 360 and 362 are driven. Gear 362 is carried on shaft 350 and hence hand power is transmitted to pinion 348 so that it climbs up rack 352 carrying the spider with it. When the end of its travel has been reached, a sling is placed on the spider and by means of a hoist (not shown) the spider is lifted completely off of shaft 22. The remaining strip is removed from rim 42. The fresh coil of strip Sw and Sn is then laid edgewise on rotor rim 42 and held in position by having its inside layers clamped between a clamp point 364 (see Figures 10 and 11) and an expander 366 is forced upwards by the driving edge of a wedge 368. The outside of the strip is then held by clamps 370 pressed tightly against the strip by screws 372 operating in brackets 374 held by cap screws 376 in rim 42. The clamping action is described more fully hereinafter.

By a reversal of operations the spider is returned to its position on shaft 22 and lowered into operating position on strip S. Pinion 348 is slid along splined shaft 350 from out of contact with rack 352 into the inoperative position. Before cutting, of course, holding pins 70 are removed from each cutting tool to permit springs 76 to come into operation, oilers 242 are placed in position as desired, and hub 104 with its shafts 88 are replaced. Hood 252 is returned to its position opposite the strip. As the first cuts of wool come off they are gathered together by hand into a ribbon having the weight and approximate number of strands desired, placed over spools 84, and fed between revolving rolls 112 and 114.

Figure 12:
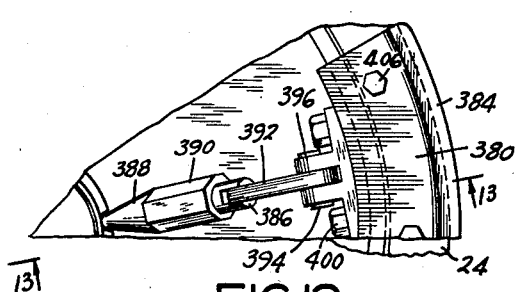
Figure 12 is a plan view similar to that of Figure 10 but showing the parts in combination with a strip winding supporting mechanism.
Figure 13:
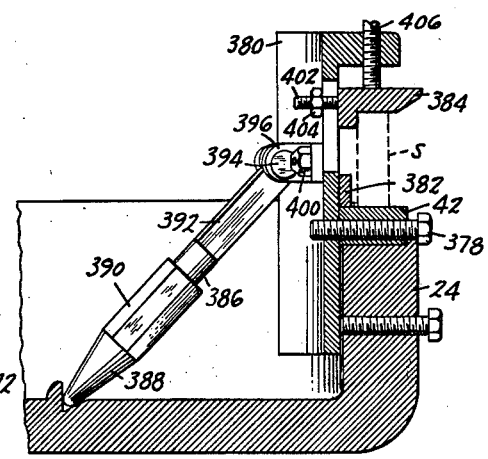
Figure 13 is a view taken along the line 13—13 of Figure 12.

When it is desired to cut metal strip without compound, then it is not necessary to remove spider 44 from shaft 22. Instead hood 252 is lowered, the tool holders are turned out of the cutting position and held in the inoperative position by pins 70, and the spider raised by hand wheel 354, as has been described, to the top of its travel by pinion 348 on rack 352, whereupon wheel 354 may be blocked to secure the assembly in raised poistion. Then at three positions approximately 120 degrees removed from each other on the inside of the peripheries of rotor rim 42 and rotor 24, I attach (see Figures 12 and 13) with screws 378 an arcuate guide plate 380. A guide stop 382 pressing against the ledge on rotor rim 42 locates the position of guide plate 380 and of a top guide 384.

In order that guide plate 380 may not be bent nor dislocated by any severe strains which may be occasioned during winding of strip about it I support it by an assembly including an adjusting strain screw 386 and a pointed pivot 388. Pivot 388 fits into an indentation in rotor 24 near its center. Strain screw 386 is threaded at one end into a strain nut 390 on pivot 388 and at its other end connects with a link 392, which link in turn pivots about a pin 394 in a hinge 396 attached to guide plate 380 by screws 400. Guide plate 380 has a slot in it through which a stud 402 from top guide 384 protrudes. Thus, the height of top guide 384 may be adjustably locked by a nut 404 with respect to the top of rim 42 to permit just enough space for the layers of strip S to slide into position. In order to reinforce top guide 384 I provide an adjustment screw 406 projecting through a threaded hole in guide plate 380.

A feed basket 408 (see Figures 14, 17 and 18) is then lowered to its position near the floor and a coil of strip S with its axis vertical is placed in it. A feed ring 410 is attached by screws 412 to feed basket 408 and the binding wires about the coil of strip S are cut. The coil immediately unwinds slightly on a plate 414 until its outer layer presses on rollers 416 held in shafts 418 in turn held in bearings 420 in feed ring 410 and feed basket 408, respectively. The feed basket is then raised by a winch 422 which winds cables 424 and 426 passing over sheaves 428. The sheaves are mounted in bushings 430 turning on shafts 432 held in brackets 434 by bolts 436, which bolts attach it to a top yoke 438 in turn attached to channel support 160. In order to take up the lateral thrust I provide between top yoke 438 and channel 160 angle braces 440.

Feed basket 408 carries bushings 442 which slide on pipe supports 444 and guide the feed basket in its vertical motion. Supports 444 are mounted in flanges 446 which are held to the floor by means of foundation bolts 448. The top ends of supports 444 include plugs 450 by means of which they are attached to top yoke 438.

When feed basket 408 has been raised to a height where the top of plate 414 is even with the top of rotor rim 42, the motion is stopped and feed basket 408 is firmly supported in that location by holding clamps cooperating with supports 444. Each clamp (see Figures 19 and 20) consists of the two U-shaped parts 452 and 454 linked together at one end by a pin 456. The other end is shaped to be drawn together by the action of a nut 458 on a locking bolt 460. Bolt 460 is free to turn about a pivot 462. The clamps are accurately leveled by pins 464 (see Figure 18) through selected holes 465 provided in supports 444. Thereafter nuts 458 are tightened on bolts 460 so that the clamps are frictionally locked on the supports. The end of strip S is then taken by hand and its forward edge rested on rim 42 at one of the clamping locations (see Figures 10 and 11).

Each strip clamp subassembly comprises essentially a clamp point 364, the position of which is determined by the surfaces cut in rim 42 and by the location of a point backer 466 and a point wedge 468. The location of point backer 466 is set by means of an adjusting screw 470 operating in a retaining ring 472 attached to rim 42 by means of bolts 474 so that clamp point 364 projects just a bit radially outwards from the outside edge of the small ledge integral with rim 42. When in this position point wedge 468 holds point 364 firmly. By means of wedge 368, expander 366 is forced upwards until it holds firmly the strip between its top point and the forward point of clamp 364.

It will be understood that during loading outside clamp 370 may be removed completely by means of screws 376 so that no obstacle will be present as the strip winds on the rim. I have found, however, that in many cases it is feasible to leave clamp 370 and its subassembly on the rim while loading.

The rotor is then slowly inched until two or three turns have been placed on the rim and then all the expander wedges 368 are driven until expanders 366 firmly clamp the strip between themselves and point clamps 364. Power is then turned on and the strip is wrapped on rotor rim 42 under tension created in two ways.

The first tension is that provided (see Figures 17 and 18) by a brake drum 476 offering a restraining force on plate 414 as it rolls on rollers 478, which rollers operate in horizontal shafts 480 held in feed basket 408 in holes bushed for that purpose. Wheel plate 414 is attached by rivets 482 to a hub 484, which hub is keyed to a shaft 486 rotating within bearings in feed basket 408 as the strip is wound on rotor rim 42. Shaft 486 carries at one end brake drum 476. The drum may be retarded by a brake strap 488. The tension between brake strap and brake drum is provided by a brake arm 490, the outer end of which is held by a holding screw 492 threaded into a hole tapped in feed basket 408.

Further guidance and the prevention of whipping are provided for by tension placed on the strip as it leaves between roller 416 and a roller 494 carried in a pivot arm 496. The free end of arm 496 is adjustably locked by a pin 498 which fits into holes drilled in feed ring 410.

When the strip has been wound except for the last turn on rotor rim 42, the motor is stopped at a time when the point of tangency between the strip and the coil has just been passed by a clamp subassembly location. The clamp subassembly is then placed in position by holding screws 376 and the clamp itself is pushed forward by adjusting screw 372, said clamp sliding on clamp guide rods 500 until its exerts pressure on the coil of strip. The rim is then turned slowly and stopped in positions such that each of the clamps 370 may be screwed in place and tightened.

It is to be observed that two strips might be wound simultaneously into a single coil on my machine. Thus, if one were stainless steel and one Monel, I would have alternate layers of the two metals and the wool cut would, correspondingly, be a mixture of the two.

By reversing the operations described above, guide plate 380 is removed completely from within the center of the rotor, the spider is lowered into cutting position, the tool holders are made operative by the removal of their holding pins, the duct is raised, and the cutting cycle is started. When all the strip has been cut down to the point where the cutters just clear the top of expander points 366 or point backers 466, whichever are higher, the machine is stopped, clamps 370 are withdrawn, expander wedges 368 are loosened and the very small amount of strip remaining is removed from the rim and the rim made ready as described for loading a new coil of strip either with or without compound or soap.

As shown in Figure 1, I prefer to erect a platform about the machine on which the operator may stand at a good working level from the cutting tools. I also find it advantageous to conserve feed baskets when I am running a plant that cuts only metal wool without soap or other compound by placing four machines 90 degrees apart (see Figure 14), using one feed basket at the center so that I may feed all of the four metal wool machines in succession from the same feed basket. Such a central feed basket would have rollers 416 and 494 spaced therearound so as to supply the various metal wool machines.

From the foregoing it will be observed that wool cutting apparatus and methods embodying my invention are well adapted to attain the ends and objects hereinbefore set forth and to be economically manufactured and employed, since the separate features are well suited to common production methods and are subject to a variety of modifications as may be desirable in adapting the invention to different applications.

As many possible embodiments may be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

I claim:

1. Apparatus for shaving metal wool from metal wool stock including: a relatively massive shaving unit embodying a multiplicity of shaving knives, a wool stock bed for clamping and supporting wool stock to be shaved by said knives, and means for causing relative movement between said unit and said bed; the weight of said unit ordinarily being distributed among said knives and carried by said bed, whereby the weight of said unit may be utilized to supply shaving pressures to said knives.

2. Apparatus for shaving metal wool from metal wool stock including: a relatively massive shaving unit embodying a multiplicity of shaving knives, a wool stock bed for clamping and supporting wool stock to be shaved by said knives, and means for causing relative movement between said unit and said bed; said unit being disposed above said bed and the weight of said unit being distributed among said knives and carried during shaving by said bed, whereby the weight of said unit may be utilized to supply shaving pressures to said knives.

3. Apparatus for shaving metal wool from metal wool stock including: a relatively massive shaving unit, a wool stock bed for clamping and supporting wool stock to be shaved, and means for causing relative movement between said unit and said bed; said unit comprising a plurality of shaving knife assemblies, each assembly including a shaving knife pivotable on an axis between a shaving position and an inoperative position, each said assembly also including means resiliently holding the knife in shaving position, each knife overlying said bed, and the weight of said unit being carried during shaving through said assemblies by said bed, whereby the weight of said unit may be utilized to supply shaving pressures.

4. Apparatus for shaving metal wool from metal wool stock including: a relatively massive shaving unit, a wool stock bed for clamping and supporting wool stock to be shaved, and means for causing relative movement between said unit and said bed; the weight of said unit being carried during shaving by said bed, whereby the weight of said unit may be utilized to supply shaving pressures to wool stock clamped on the bed, and means for lifting said unit completely off of said bed, whereby additional wool stock to be shaved may be supplied to the bed.

5. Apparatus for shaving metal wool from metal wool stock including: a bed rotatable in a horizontal plane for supporting wool stock to be shaved, and a nonrotatable vertically guided wool shaving spider assembly overlying said bed; said spider assembly embodying a relatively massive spider and a plurality of wool shaving knives individually mounted thereupon, the weight of said spider normally being distributed among and carried by said knives to constrain each knife toward said bed with shaving pressure.

6. Apparatus for shaving metal wool from metal wool stock including: a vertically extending main shaft, a bed rotatable in a horizontal plane about the axis of said shaft for supporting wool stock to be shaved, means for rotating said bed, and a nonrotatable wool shaving spider assembly overlying said bed and constrained by said shaft to vertical up and down movement; said spider assembly embodying a relatively massive spider and a plurality of wool shaving knives individually mounted thereupon, the weight of said spider normally being distributed among and carried by said knives to constrain each knife toward said bed with shaving pressure.

7. Apparatus for shaving metal wool from metal wool stock including: a bed disposed in a horizontal plane for supporting wool stock to be shaved, a wool shaving spider assembly overlying said bed and means for causing relative rotary movement between said bed and said spider assembly; said spider assembly embodying a relatively massive spider and a plurality of wool shaving knives individually mounted thereupon, the weight of said spider normally being distributed among and carried by said knives to constrain each knife toward said bed with shaving pressure.

8. Apparatus for shaving metal wool from metal wool stock including: a vertically extending main shaft, a bed rotatable in a horizontal plane about the axis of said shaft for supporting wool stock to be shaved, a nonrotatable wool shaving spider assembly constrained by said shaft to vertical movement overlying said bed and adapted to be supported during shaving thereby, and means for lifting said spider assembly with respect to said bed.

9. Apparatus for shaving metal wool from metal wool stock including: a vertically extending main shaft, a bed rotatable in a horizontal plane about the axis of said shaft for supporting wool stock to be shaved, means for rotating said bed, and a nonrotatable wool shaving spider assembly disposed above said bed and constrained by said shaft to vertical unitary movement; said spider assembly comprising a plurality of shaving knife assemblies, and the weight of said spider assembly being carried during shaving by said knife assemblies.

10. Apparatus for shaving metal wool from metal wool stock including: a vertically extending main shaft, a bed rotatable in a horizontal plane about the axis of said shaft for supporting wool stock to be shaved, means for rotating said bed, and a nonrotatable wool shaving spider assembly disposed above said bed and constrained by said shaft to vertical unitary movement; said spider assembly comprising a plurality of shaving knife assemblies, each shaving knife assembly comprising a pivotally mounted shaving knife movable either to a shaving position or to an inoperative position and means normally resiliently holding the knife in the shaving position, and the weight of said spider assembly being carried during shaving by said knife assemblies.

11. In a metal wood shaving installation of the type including a vertically extending main shaft by which a nonrotatable wool shaving spider assembly is constrained to vertical movement and wherein a coil of metal wool strip is horizontally supported upon a shaving bed rotatable with respect to and below a plurality of wool shaving knives embodied in and carried by the spider assembly with the weight of the spider assembly carried through the shaving knives to upper surfaces of the coil of metal strip whereby the weight of the spider assembly provides shaving pressure upon each knife, the combination with said installation of: a system for supplying blasts of air to metal wool being shaved, said system including a plurality of air jets each disposed adjacent to a shaving knife, conduit means supplying air under pressure to said jets, and said jets being carried by said spider assembly whereby as the metal strip is converted into metal wool and the spider assembly descends vertically said jets correspondingly descend and continue to supply air directly to metal wool being shaved.

12. In a metal wool shaving installation of the type including a vertically extending main shaft by which a nonrotatable wool shaving spider assembly is constrained to vertical movement and wherein a coil of metal wool strip is horizontally supported upon a shaving bed rotatable with respect to and below a plurality of wool shaving knives embodied in and carried by the spider assembly with the weight of the spider assembly carried through the shaving knives to upper surfaces of the coil of metal strip whereby the weight of the spider assembly provides shaving pressure upon each knife, the combination with said installation of: a system for applying a compound to upper surfaces of the coil of metal strip, said system including conduit means leading toward the coil of metal strip, said conduit means being carried at least in part by the spider assembly whereby as the metal strip is converted into metal wool and the spider assembly descends vertically at least part of said system also descends so as to continue to apply compound to the strip.

13. In a metal wool shaving installation of the type including a vertically extending main shaft by which a nonrotatable wool shaving spider assembly is constrained to vertical movement and wherein a coil of metal wool strip is horizontally supported upon a shaving bed rotatable with respect to and below a plurality of wool shaving knives embodied in and carried by the spider assembly with the weight of the spider assembly carried through the shaving knives to upper surfaces of the coil of metal strip whereby the weight of the spider assembly provides shaving pressure upon each knife, the combination with said installation of: a superstructure supported above the spider assembly and extending outwardly from the main shaft, said superstructure embodying arm-like members, said members including metal wool guide portions arranged to constrain metal wool filaments into predetermined directions as the filaments are led from the shaving knives.

References Cited in the file of this patent

UNITED STATES PATENTS

| Number | Name | Date |
|---|---|---|
| 91,267 | Repetti | June 15, 1869 |
| 662,392 | Buhne | Nov. 27, 1900 |
| 784,515 | Calkins | Mar. 7, 1905 |
| 1,419,472 | Schonitzer | June 13, 1922 |
| 1,598,814 | Galvin | Sept. 7, 1926 |
| 1,886,662 | Field | Nov. 8, 1932 |
| 1,886,664 | Field | Nov. 8, 1932 |
| 1,912,964 | Boehler | June 6, 1933 |
| 1,976,013 | Field | Oct. 9, 1934 |
| 1,977,053 | Galvin | Oct. 16, 1934 |

FOREIGN PATENTS

| Number | Country | Date |
|---|---|---|
| 362,583 | France | June 29, 1906 |